United States Patent [19]

Murschall et al.

[11] Patent Number: 5,246,763
[45] Date of Patent: Sep. 21, 1993

[54] NON-SEALABLE, MULTI-LAYER POLYPROPYLENE FILM

[75] Inventors: Ursula Murschall, Nierstein; Herbert Peiffer, Mainz-Finthen; Gunter Schloegl, Kelkheim, all of Fed. Rep. of Germany

[73] Assignee: Hoechst Aktiengesellschaft, Frankfurt am Main, Fed. Rep. of Germany

[21] Appl. No.: 673,001

[22] Filed: Mar. 21, 1991

[30] Foreign Application Priority Data

Mar. 23, 1990 [DE] Fed. Rep. of Germany ....... 4009350

[51] Int. Cl.$^5$ .............................................. B32B 23/02
[52] U.S. Cl. ................................ 428/195; 156/244.11; 428/216; 428/402; 428/447; 428/349; 428/516
[58] Field of Search ...................... 428/35.2, 215, 447, 428/516, 349, 216, 402; 156/244.11

[56] References Cited

U.S. PATENT DOCUMENTS

| | | | |
|---|---|---|---|
| 4,502,263 | 3/1985 | Crass et al. | 53/396 |
| 4,720,420 | 1/1988 | Crass et al. | 428/216 |
| 4,912,091 | 3/1990 | Bothe et al. | 428/35.2 |
| 4,983,447 | 1/1991 | Crass et al. | 428/216 |
| 5,026,592 | 6/1991 | Janocha et al. | 428/349 |

FOREIGN PATENT DOCUMENTS

| | | |
|---|---|---|
| 0114312 | 8/1984 | European Pat. Off. . |
| 0263963 | 4/1986 | European Pat. Off. . |
| 0184094 | 6/1986 | European Pat. Off. . |
| 0234758 | 9/1987 | European Pat. Off. . |
| 0252718 | 1/1988 | European Pat. Off. . |
| 0352463 | 1/1990 | European Pat. Off. . |
| 2055688 | 3/1981 | United Kingdom . |

Primary Examiner—Edith Buffalow
Attorney, Agent, or Firm—Foley & Lardner

21 Claims, No Drawings

NON-SEALABLE, MULTI-LAYER POLYPROPYLENE FILM

BACKGROUND OF THE INVENTION

The present invention relates to a non-sealable, multi-layer polypropylene film, its manufacture and its method of use.

Sealable and non-sealable polypropylene films have been described in many publications. One problem which always arises with these films is the adhesion of coatings, prints or adhesives on this type of film, which is in most cases insufficient due to the highly nonpolar character of the polyolefins. Since environmental protection regulations are becoming ever more stringent, aqueous coating systems are gaining more and more importance, but it is precisely these types of coatings that lead to very specific adhesion problems due to their polarity.

EP-A-0,234,758 describes a polypropylene film which is said to be suitable in particular for coating with aqueous coatings. However, the great drawback of this film is that it only has good coatability shortly after its manufacture and loses it with increasing storage time. When producing laminates using this film and employing aqueous adhesives, it was discovered that the curing of the adhesives is considerably delayed on storage.

SUMMARY OF THE INVENTION

It is therefore an object of the present invention to provide a polypropylene film which, apart from the usual essential properties, such as gloss, scratch-resistance, transparency etc., has in particular very good long-term stability of its adhesive properties with respect to coatings, in particular aqueous-based coating systems, prints and adhesives. It is also an object to provide a process for producing this film and a laminate which incorporates this film.

In accomplishing the foregoing objects there is provided according to the present invention a non-sealable, multi-layer polypropylene film comprising a base layer comprised of polypropylene, and at least one top layer disposed on said base layer, said top layer comprising a mixture of a propylene/butylene copolymer and an ethylene/propylene/butylene terpolymer, wherein said mixture includes ethylene in an amount of about 0.1 to 7% by weight, propylene in an amount of about 68 to 95.9% by weight and butylene in an amount of about 4 to 25% by weight, relative to the total weight of the mixture, and said top layer has a layer thickness of not greater than about 0.3 μm.

There also is provided according to the present invention, a process for producing the above-described polypropylene film which comprises providing melts corresponding to the individual layers, coextruding the melts through a sheet die, cooling the resultant multi-layer film so as to solidify it, biaxially orienting the film, heat-treating the film so as to heat-set it, and subjecting at least one surface of the film to a corona treatment.

There also is provided, according to the present invention, a laminate which includes the above-described polypropylene film.

Further objects, features, and advantages of the present invention will become apparent from the detailed description of preferred embodiments that follows.

DETAILED DESCRIPTION OF THE PREFERRED EMBODIMENTS

The base layer of the multi-layer film according to the present invention comprises a propylene polymer which predominantly comprises propylene and has a melting point of, preferably, about 162° to 168° C. Isotactic polypropylene having an n-heptane-soluble proportion of about 6% by weight or less is a preferred propylene polymer. The propylene polymer of the base layer in general has a melt index of about 1.5 to 5 g/10 min at 230° C. and a load of 21.6 N (as determined according to DIN 53 735).

The top layer comprises in particular a mixture of a propylene/butylene copolymer and an ethylene/propylene/butylene terpolymer in a mixing ratio of about 4:1 to 1:4, in which the copolymer includes propylene in an amount of about 98 to 75% by weight and butylene in an amount of about 2 to 25% by weight and in which the terpolymer includes ethylene in an amount of about 0.1 to 7% by weight, propylene in an amount of about 95.9 to 68% by weight and butylene in an amount of about 4 to 25% by weight. Such a mixture has a p-xylene-soluble proportion of about 25 to 70% by weight, preferably about 40 to 60% by weight, at 20° C. The melting point of the mixture is about 130° C. or higher, and the melt flow index is in the range from about 0.1 to 16 g/10 min at 230° C. and a load of 21.6 N.

A copolymer/terpolymer mixture made of alphaolefins and marketed by Mitsui Petrochemicals under the name TAFMER XR-107 L is particularly suitable for use in the present invention. TAFMER XR-107L comprises a mixture of an ethylene/propylene/butylene terpolymer and a propylene/butylene copolymer. This mixture includes ethylene in an amount of 0.5% by weight, propylene in an amount of 77.5% by weight and butylene in an amount of 22% by weight.

In order to improve certain properties of the film according to the present invention even further, the layers can include suitable active compound components each in effective amounts, preferably antistatics and/or lubricants.

Preferred antistatics are essentially straight-chain and saturated aliphatic, tertiary amines containing an aliphatic radical of 10 to 20 carbon atoms and substituted by 2-hydroxyalkyl-($C_1$–$C_4$) groups, of which N,N-bis(2-hydroxyethyl) alkylamines of $C_{10}$–$C_{20}$, preferably $C_{12}$–$C_{18}$, are particularly suitable as alkyl groups. The effective amount of antistatic is in the range from about 0.05 to 1% by weight, relative to the layer. It has proved to be particularly advantageous to provide the base coat with about 0.1 to 0.25% by weight of N,N-bis(2-hydroxyethyl)alkylamine containing aliphatic radicals of 10 to 20 carbon atoms.

Advantageous lubricants include carboxamides, such as erucamide and stearamide, or polydiorgano-siloxanes.

The top coat or the top coats preferably additionally includes or include conventional inorganic or organic antiblocking agents. Preferable antiblocking agents are inorganic additives, for example silicon dioxide and calcium carbonate or the like, or organic additives, for example benzoguanine/formaldehyde copolymers. It is important that the antiblocking agent have an average particle size of between about 1 and 4 μm. The refractive index of the antiblocking agents is between about 1.4 and 1.6. The amount added is about 0.1 to 0.5% by weight, relative to the weight of the top coats.

The preferred thickness of the top coat or the top coats is in the range from about 0.10 to 0.3 μm.

The polyolefin film according to the present invention, which comprises at least two layers, in which the top coats can have the same or different compositions, are produced by a coextrusion process. In the context of this process, the procedure is such that the melts corresponding to the individual layers of the film are coextruded through a sheet die, the film thus obtained is cooled to solidify it, the film is biaxially oriented, the biaxially oriented film is heat-set and the surface layer intended for corona treatment is subjected to a corona treatment. The biaxial orienting can be carried out simultaneously or successively, successive biaxial orientating, in which first longitudinal orientating (along the machine direction) and then transverse orientating (perpendicular to the machine direction) are carried out, being preferred. More specifically, the polymer or the polymer mixture of the individual layers is first compressed or liquefied in an extruder. The melts are then simultaneously extruded through a sheet die, and the extruded multi-layer film is cooled and solidified on one or more rolls which are maintained at about 30° to 50° C. by cooling. The film thus obtained is then oriented along and transversely to the extrusion direction, which leads to orienting of the molecular chains. The orienting stretching ratio in the longitudinal direction is preferably about (4 to 7):1 and in the transverse direction preferably about to (8 to 10):1. The longitudinal orienting is carried out at a film temperature of, preferably, about 120° to 140° C. and the transverse orienting preferably at about 160° to 175° C. The longitudinal orienting is advantageously carried out by means of two rolls which, according to the desired draw ratio, run at different speeds, and the transverse orienting by means of a suitable tenter frame. The biaxial orienting of the film is followed by heat-setting (heat treatment). This is done by maintaining the film at a temperature of about 150° to 160° C. for about 0.5 to 10 s. The corona treatment is preferably carried out using an alternating voltage of about 10,000 V and 10,000 Hz, on one or two sides as desired. The film thus produced is wound in a conventional manner by means of a winding apparatus and has a surface tension, directly after production, of about 36 to 42 mN/m, preferably about 38 to 40 mN/m, on the treated side.

The polyolefin multi-layer film according to the present invention is suitable in particular for the production of laminates. This is due to the fact that it has all the important properties demanded of a polyolefin film with respect to its use as laminatable or coatable film. It has in particular:

very good optical properties, in particular high gloss and low opacity,
high scratch resistance,
good immediate and long-term coatability, in particular with aqueous systems,
good suitability for surface treatment and good odor properties and
good further processing properties.

Furthermore, the film according to the present invention is very particularly suitable as backing film for aqueous barrier coating systems, for example based on aqueous dispersions of polyvinylidene chloride or ethylene/vinyl alcohol copolymers. Excellent prints using aqueous printing inks, for example two-component reactive dyes, can also be produced on the present film.

The invention is now illustrated in more detail by way of examples:

In the examples and comparative examples which follow, each of the polyolefin films used is a biaxially oriented (longitudinal direction 5:1, transverse direction 10:1) polyolefin film having a base layer and two top layers in which the base layer comprises an isotactic polypropylene having an n-heptane-soluble proportion of 4% by weight, a melting point of 165° C. and a melt flow index of 3.5 g/10 min at 230° C. and a load of 21.6 N (measured according to DIN 53 735) as the main component. The thickness of the base layer is about 12 μm, and the thickness of the two top layers surrounding the base layer is in each case about 0.2 μm. The three-layer polyolefin films have been produced by the known coextrusion process.

For stabilization, all layers include 0.1% by weight of pentaerythritol tetrakis-3-(3,5-di-tert.butyl-4-hydroxyphenyl)propionate (Irganox 1010®) and, for neutralizing acid catalyst residues, 0.05% by weight of calcium stearate. The base layer furthermore includes 0.2% by weight of N,N-bis(ethoxy)alkylamine (alkyl radical $C_{10}$–$C_{22}$).

The following methods of measurement were used to characterize the raw materials and films.

Melt flow index:

DIN 53 735 at 230° C. and a load of 21.6 N.

Opacity

The opacity of the film is measured by following ASTM-D 1003-52, using a 1° slit diaphragm instead of a 4° pinhole diaphragm and the opacity in percent is recorded for four film layers lying one on top of the other. Four layers were selected since this allows optimum use of the measuring range. The opacity was rated at less than 15% = very good, 15% to 25% = moderate and over 25% = poor.

Gloss:

The gloss is determined by DIN 67 530. The reflector value is measured as optical characteristic of the surface of a film. The ASTM standard D-523-78 and the ISO standard 2813 were followed and the angle of incidence was set to 20°. Under the set angle of incidence, a light ray impinges on the flat test surface, and is reflected or scattered by it. The light rays which enter the photoelectronic receiver are displayed as a proportional electrical quantity. The measured value is dimensionless and must be given together with the angle of incidence.

Scratch resistance or scratch sensitivity:

The scratch resistance is determined by following DIN 53 754.

The abraser used for determining the scratch resistance is Taber Model 503 from Teledyne Taber, in which frictional wheels of the Calibrade R H18 brand loaded with 250 g are used. Scratch resistance or scratch sensitivity is understood to mean the increase in opacity of the scratched film compared with the original film after 50 revolutions of the test disk. The scratch resistance is designated as very good if the increase in opacity is up to 20%, as moderate if the increase in opacity is 20 to 25%, and as poor at increases in opacity of more than 25%.

Fall-off behavior and odor:

The corona treatment was carried out such that the treated film surface had in each case a treatment intensity of 39 mN/m directly after the treatment. The treatment intensity was determined by the ink method (DIN 53 364).

The measurement of the treatment intensity was repeated at intervals of 14 days each. The fall-off behavior was considered very good if the treatment intensity was still at least 37 mN/m after four months ($\Delta B \leq 2$ mN/m). The fall-off behavior was considered poor if the treatment intensity was $\leq 35$ mN/m ($\Delta B \geq 4$ mN/m). The odor of the films was evaluated by an odor test.

Odor:

The film to be evaluated is used to produce a film stack (DIN A 4) about 1 cm thick, which is wrapped in Al foil. To evaluate the odor, the film stack is unwrapped after 2 days of storage and the odor between the film layers was determined.

Odor ratings:
+ +: slight odor
+ −: noticeable odor
− −: distinct odor

Suitability for Corona Treatment

The films were subjected to corona treatment under the same conditions. While treatment intensities of 39 mN/m were obtained in Example 1 and Comparative Examples CE 1 and CE 2, Comparative Examples CE 3 and CE 4 only have an intensity of 36 mN/m.

Printability 14 days after their production (short-term evaluation) or 6 months after their production (long-term evaluation), the films were printed. Ink adhesion was evaluated by means of an adhesive tape test. If no ink could be removed by means of the adhesive tape, the ink adhesion was considered very good. If a small amount of ink was removed, the ink adhesion was considered good and if a significant amount of ink was removed, it was considered poor.

Bonding Ability Using Aqueous Adhesives/Further Processing

To evaluate the bonding ability using aqueous adhesives and the further processing properties, laminates with Pergamyn paper (weight per unit area = 40 g/m²) were produced. The adhesive used was the aqueous reactive two-component adhesive Aquabond A+C from Morton Thiokol GmbH, Wikolin Polymer Division (Germany).

The laminates were manufactured 10 days after the production of the films and 6 months after the production of the films. Laminates in which the bonding strength reached the strength of the paper used directly after production were considered very good. Laminates which took longer were considered moderate.

Laminates which did not reach the strength of the paper were considered poor.

The structure of the films from the examples and the comparative examples can be seen from Table 1. The superior properties of the films according to the invention are evident from Table 2.

TABLE 1

| | Examples and Comparative Examples (CE) | | | | |
|---|---|---|---|---|---|
| | Example 1 | CE 1 | CE 2 | CE 3 | CE 4 |
| | Tafmer XR-107 LN | Tafmer XR-107 LN | $C_2$-$C_3$ copolymer | Polypropylene | Polypropylene |
| | $C_2$: about 0.5% by weight | $C_2$: about 0.5% by weight | $C_2$: about 4% by weight | | |
| | $C_3$: about 77.5% by weight | $C_3$: about 77.5% by weight | $C_3$: about 96% by weight | | |
| | $C_4$: about 22% by weight | $C_4$: about 22% by weight | | | |
| | Layer thickness 0.2 μm | Layer thickness 0.5 μm | Layer thickness 0.2 μm | Layer thickness 0.5 μm | Layer thickness 0.2 μm |
| | $\Delta H_M = 74$ J/g | $\Delta H_M = 74$ J/g | $\Delta H_M = 72$ J/g | $\Delta H_M = 125$ J/g | $\Delta H_M = 125$ J/g |
| | $T_M = 137°$ C. | $T_M = 137°$ C. | $T_M = 139°$ C. | $T_M = 162°$ C. | $T_M = 162°$ C. |
| | $i_{21.6} = 7.1$ g/10 min | $i_{21.6} = 7.1$ g/10 min | $i_{21.6} = 7$ g/10 min | $i_{21.6} = 5$ g/10 min | $i_{21.6} = 5$ g/10 min |

TABLE 2

| | Opacity | Gloss | Suitability for surface treatment | Printability, bonding ability/curing | | Odor | Fall-off behavior of the corona treatment |
|---|---|---|---|---|---|---|---|
| | | | | Short-term | Long-term | | |
| Example 1 | + + | + + | + + | + + | + + | + + | + + |
| CE 1 | − + | − + | + + | + + | + + | + + | + + |
| CE 2 | − | − | + − | + + | + + | − | + + |
| CE 3 | + + | + + | − | + − | − | + − | − |
| CE 4 | + + | + + | − | + − | − | + − | − |

+ + = very good
+ − = good
− + = moderate
− = poor

What is claimed is:

1. A non-sealable, multi-layer polypropylene film, comprising a base layer comprised of polypropylene, and at least one top layer disposed on said base layer, said top layer comprising a mixture of a propylene/butylene copolymer and an ethylene/propylene/butylene terpolymer, wherein said mixture includes ethylene in an amount of about 0.1 to 71% by weight, propylene in an amount of about 68 to 95.9% by weight and butylene in an amount of about 4 to 25% by weight, relative to the total weight of said mixture, and said top layer is non-sealable and printable and has a layer thickness of not greater than about 0.3 μm.

2. A film according to claim 1, wherein said base layer comprises a polypropylene which predominantly comprises propylene and has a melting point of about 162° to 168° C.

3. A film according to claim 2, wherein said polypropylene comprises isotactic polypropylene having an n-heptane-soluble proportion of about 6% by weight or less.

4. A film according to claim 1, wherein said top layer comprises a mixture of copolymer and terpolymer in a mixing ratio of about 4:1 to 1:4 and said copolymer includes propylene in an amount of about 98 to 75% by weight and butylene in an amount of about 2 to 25% by weight and said terpolymer includes ethylene in an amount of about 0.1 to 7% by weight, propylene in an amount of about 95.9 to 68% by weight and butylene in an amount of about 4 to 25% by weight.

5. A film according to claim 1, wherein the thickness of said top layer is from about 0.10 to 0.3 μm.

6. A film according to claim 1, wherein said copolymer and terpolymer mixture has a p-xylene-soluble proportion of about 25 to 70% by weight at 20° C.

7. A film according to claim 6, wherein said copolymer and terpolymer mixture has a p-xylene-soluble proportion of about 40 to 60% by weight at 20° C.

8. A film according to claim 1, wherein at least one of said base layer and top layer further comprise at least one active compound selected from the group consisting of an antistatic, a lubricant and an antiblocking agent.

9. A film according to claim 8, wherein said active compound comprises an antistatic comprising a straight-chain and saturated aliphatic, tertiary amine having an aliphatic radical of 10 to 20 carbon atoms and substituted by at least one 2-hydroxyalkyl-$(C_1-C_4)$ group.

10. A film according to claim 8, wherein said active compound comprises a lubricant selected from the group consisting of a carboxamide and a polydiorganosiloxane.

11. A film according to claim 8, wherein said top layer contains an antiblocking agent selected from the group consisting of silicon dioxide, calcium carbonate and benzoguanine/formaldehyde copolymer.

12. A film according to claim 1 produced by a process comprising the sequential steps of:

(a) providing a first melt comprised of polypropylene and at least one second melt comprising a mixture of a propylene/butylene copolymer and an ethylene/propylene/butylene terpolymer, wherein said mixture includes ethylene in an amount of about 0.1 to 7% by weight, propylene in an amount of about 68 to 95.9% weight and butylene in an amount of about 4 to 25% by weight, relative to the total weight of said mixture;

(b) coextruding said first and second melts through a sheet die;

(c) cooling the resultant multi-layer film so as to solidify it;

(d) biaxially orienting said film;

(e) heat-treating said film so as to heat-set it; and (f) subjecting at least one surface of said film to a corona treatment.

13. A laminate comprising a non-sealable, multi-layer polypropylene film according to claim 1.

14. A laminate according to claim 13, further comprising an aqueous-based coating.

15. A laminate according to claim 14, wherein said aqueous-based coating is selected from the group consisting of an aqueous dispersion of polyvinylidene chloride, an aqueous dispersion of an ethylene/vinyl alcohol copolymer, and an aqueous printing ink.

16. A film according to claim 1, comprising two of said non-sealable, printable top layers, one on either side of said base layer.

17. A film according to claim 1, wherein said top layer is coated with an aqueous based coating or adhesive.

18. A film according to claim 1, wherein said top layer is printed with an aqueous based ink.

19. A film according to claim 1, wherein said top layer is 0.2 microns thick and comprises 0.5% by weight of ethylene, 77.5% by weight of propylene, and 22% by weight of butylene.

20. A film according to claim 1, wherein said top layer contains 0.1 to 0.5% by weight of an antiblocking agent having an average particle size between about 1 and 4 microns.

21. A film according to claim 1, wherein said top layer is corona-treated.

* * * * *

UNITED STATES PATENT AND TRADEMARK OFFICE
CERTIFICATE OF CORRECTION

PATENT NO. : 5,246,763
DATED : September 21, 1993
INVENTOR(S) : Ursula MURSCHALL, Herbert PEIFFER and Gunter SCHLOEGL It is certified that error appears in the above-identified patent and that said Letters Patent is hereby corrected as shown below:

Claim 1, column 6, line 61, "71%" should read --7%--.

Signed and Sealed this

Twenty-fourth Day of May, 1994

Attest:

BRUCE LEHMAN

*Attesting Officer*     *Commissioner of Patents and Trademarks*